United States Patent
Kidode et al.

(10) Patent No.: US 7,006,079 B2
(45) Date of Patent: Feb. 28, 2006

(54) INFORMATION INPUT SYSTEM (75) Inventors: Masatsugu Kidode, Nara (JP); Norimichi Ukita, Ikoma (JP); Akihiro Terabe, Mishima (JP); Yasuyuki Kono, Nishinomiya (JP)

(73) Assignee: Nara Institute of Science and Technology, Nara (JP)

( * ) Notice: Subject to any disclaimer, the term of this patent is extended or adjusted under 35 U.S.C. 154(b) by 378 days.

(21) Appl. No.: 10/358,840

(22) Filed: Feb. 5, 2003

(65) Prior Publication Data

US 2004/0041794 A1    Mar. 4, 2004

(30) Foreign Application Priority Data

Aug. 30, 2002  (JP) .............................. 2002-255676

(51) Int. Cl.
*G09G 5/00*       (2006.01)

(52) U.S. Cl. ........................... 345/173; 345/156; 345/8
(58) Field of Classification Search ........ 345/156–160, 345/162, 166, 173–179, 7–8, 862, 165, 181, 345/857; 178/18.01, 18.04, 18.09, 18.11, 178/19.01, 19.05
See application file for complete search history.

(56) References Cited

U.S. PATENT DOCUMENTS

| | | | | |
|---|---|---|---|---|
| 6,211,856 B1 * | 4/2001 | Choi et al. | ................... | 345/666 |
| 6,531,999 B1 * | 3/2003 | Trajkovic | ................... | 345/157 |
| 6,639,584 B1 * | 10/2003 | Li | ................... | 345/173 |
| 6,803,906 B1 * | 10/2004 | Morrison et al. | ........... | 345/173 |
| 2004/0201575 A1 * | 10/2004 | Morrison | .................... | 345/173 |

FOREIGN PATENT DOCUMENTS

| | | | |
|---|---|---|---|
| JP | 10-021363 | * | 1/1998 |
| JP | 2000-148375 | | 5/2000 |

* cited by examiner

*Primary Examiner*—Ricardo Osorio
*Assistant Examiner*—Mansour M. Said
(74) *Attorney, Agent, or Firm*—Jordan and Hamburg LLP (57) ABSTRACT

There is provided an information input system enabling the realization of an input method easily understandable and operable by intuition. This information input system is provided with a camera 11 for picking up an image of a specified area including a fingertip OF of an operator and an input surface 17 as a photographed image, a contact discriminator 154 for discriminating whether or not the fingertip OF and the input surface 17 are in contact with each other by specifying the fingertip OF and the input surface 17 included in the photographed image, and a fingertip position detector 152 for detecting a relative position of the fingertip OF with respect to the input surface 17 when the contact discriminator 154 judges that the fingertip OF and the input surface 17 are in contact with each other.

19 Claims, 8 Drawing Sheets

INFORMATION INPUT SYSTEM

BACKGROUND OF THE INVENTION

1. Field of the Invention

The present invention relates to an information input system for inputting information to a computer or like device.

2. Description of the Related Art

In recent years, it has become possible to carry computers around with the advent of smaller and lighter laptop PCs and personal digital assistants (PDAs). Further, wearable computers designed to be worn on human bodies like accessories are being developed, and we are exposed to live while wearing computers in the near future. When such a time comes, input interfaces for the wearable computers become necessary.

In order to execute an application enabling the input of hand-written memos and diary on the wearable computer, there is a demand for the realization of a system enabling the input of arbitrary contents such as pictures and hand-written characters in addition to characters. An air pen system, a system for inputting characters hand-written in the air and other systems have been studied as systems enabling the input of such arbitrary contents.

The air pen system is such that a user wearing a head mount display (HMD) and holding a pen device moves the pen device in the air to draw a virtual hand-written memo at that place.

Further, the system for inputting the characters hand-written in the air is such that, when a user wearing a mountable video camera and a HMD moves his fingertip in the air to draw an arbitrary character, a trace of the fingertip is detected and displayed on the HMD. The user writes one character by moving his fingertip in the air and inputs information on the character or the like by placing his hand outside an image frame upon completely writing the character.

However, since the above pen device utilizes a gyromouse mechanism using a gyrosensor, an acceleration sensor, etc., it is necessary to write in a unique manner while twisting the wrist. Thus, the pen device is difficult for beginners to handle, making it difficult to input. Further, the spatial position of a virtual plane is difficult to grasp because characters or the like are written in the air, and the input has to be started and ended by clicking a button provided on the pen device, making it difficult to operate by intuition.

Further, the system for inputting the characters hand-written in the air cannot detect the start and end of writing while the finger is located in the image frame of the video camera. Thus, character input becomes special and characters have to be written with a single stroke. Furthermore, every time one character is written, the finger has to be placed outside the image frame of the video camera, resulting in a very unnatural input method. Therefore, this system also has a problem of being unable to operate by intuition like the above pen device.

SUMMARY OF THE INVENTION

In view of the problems residing in the prior art, an object of the present invention is to provide an information input system enabling the realization of an input method easily understandable and operable by intuition.

In order to solve the above problems, the invention is directed to an information input system for receiving an information inputted by an operator as an input information, comprising: photographing means for picking up an image of a specified detection area including an operable object and a touchable object touchable by the operable object as a photographed image, contact discriminating means for specifying the operable object and the touchable object from the photographed image to discriminate whether or not the operable object and the touchable object are in contact with each other, detecting means for detecting a relative position of the operable object with respect to the touchable object if the contact discriminating means judges that the operable object and the touchable object are in contact with each other, and receiving means for receiving a trace of the operable object on the touchable object as the input information by repeatedly detecting the relative position of the operable object with respect to the touchable object.

With this construction, whether or not the operable object such as a fingertip or a pen held by the operator is in contact with the touchable object such as a note or a thick sheet is discriminated by the contact discriminating means. If they are in contact, the relative position of the operable object with respect to the touchable object is detected by the detecting means. By repeatedly detecting the relative position of the operable object with respect to the touchable object, the trace of the operable object moved in contact with the touchable object is received as the input information by the receiving means.

Specifically, since the trace of the operable object can be received as the input information only when the operator moves the operable object on the touchable object, the inputting operation can be performed by intuition and operability in inputting hand-written characters and image can be remarkably improved. Further, since the trace of the operable object is received as the input information only when the operable object is in contact with the touchable object, it is not necessary, unlike the conventional system for inputting the characters hand-written in the air, to place the finger outside an image frame of a video camera every time one character is completely written, and the received information needs not be written with a single stroke, thereby realizing a more natural input method.

These and other objects, features, and advantages of the present invention will become more apparent upon reading the following detailed description along with the accompanying drawings.

BRIEF DESCRIPTION OF DRAWINGS

FIGS. 3A, 3B, 3C and 3D are diagrams showing a process of detecting the outline of an input surface, wherein FIGS. 6A, 6B and 6C are exemplary differential histograms in a detection area of m×m pixels centered on the fingertip with vertical and horizontal axes representing luminance and differential values, respectively, wherein

DETAILED DESCRIPTION OF THE INVENTION

Figure 1:
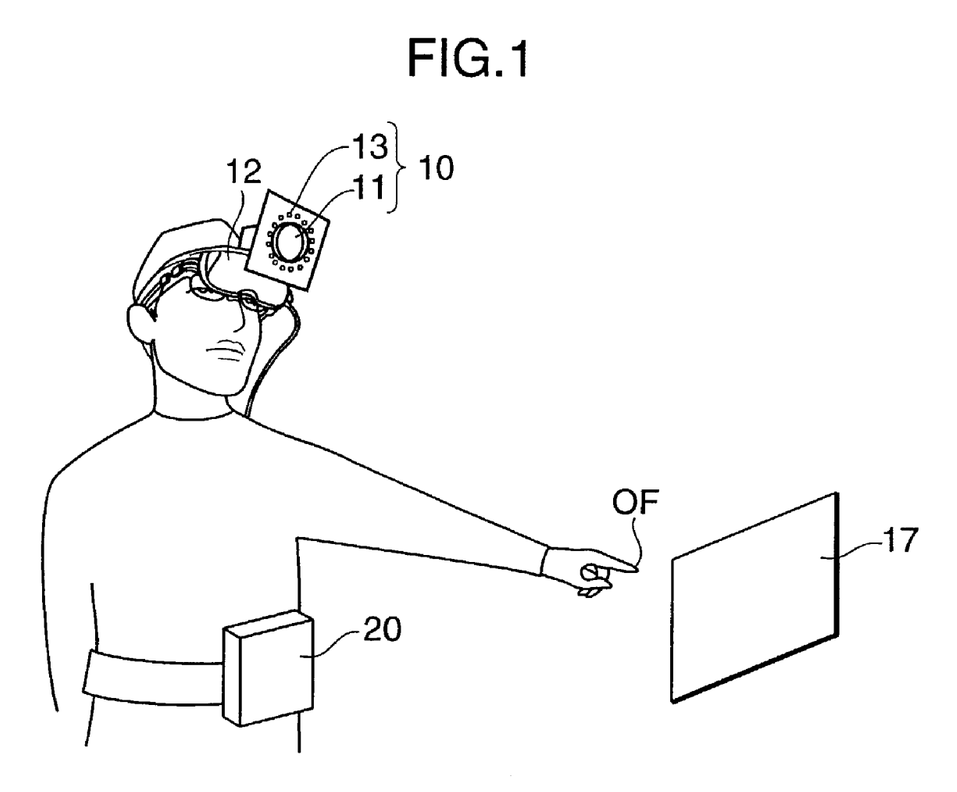
FIG. 1 is a diagram showing an external construction of an information input system according to the present invention.

Hereinafter, one embodiment of an information input system according to the present invention is described with reference to the accompanying drawings. FIG. 1 is a diagram showing an external construction of the information input system according to this embodiment. This information input system is comprised of a mountable unit 10 mountable, for example, on the head of an operator and a computer main unit 20 mountable, for example, on the waist of the operator via a belt.

The mountable unit 10 is provided with a camera 11 including CCD sensing elements for picking up a photographed image by receiving light emitted from an infrared light emitting device 13 and reflected from an object to be photographed; a head mount display (HMD) 12 formed by a liquid crystal display device, provided below the camera 11 and wearable above the eyes of the operator; and the infrared light emitting device 13 for emitting infrared rays of a specified wavelength.

The camera 11 is a small-size video camera wearable on the head of the operator, for example, a black-and-white CCD camera produced by Sony (XC-E510), and an infrared pass filter such as an IR76 is mounted thereon. The camera 11 picks up a black-and-white image having a resolution of, e.g. 320×240 bits as a photographed image. The infrared light emitting device 13 includes a specified number of, for example, 24 infrared light-emitting diodes, which are arrayed along the outer periphery of a lens of the camera 11.

The camera 11 and the computer main unit 20 are connected via a video cable, and the photographed image picked up by the camera 11 is transmitted to the computer main unit 20 via this video cable. Instead of the video cable, the camera 11 and the computer main unit 20 may be so connected as to communicate by means of radio signals, and a photographed image picked up by the camera 11 may be transmitted to the computer main unit 20 after being converted into a radio signal.

Although being connected with the computer main unit 20 via a display cable, the HMD 12 may be so connected as to communicate by means of radio signals similar to the camera 11.

The image photographed by the camera 11 by causing the infrared light emitting device 13 to emit a light is displayed on the HMD 12 after specified image processings described later are applied thereto upon being inputted to the computer main unit 20.

It does not matter of which material an input surface (object) 17 is made. In this embodiment, the input surface 17 is such that a blank drawing paper is adhered to a surface of a flat rectangular member made of styrofoam.

Figure 2:
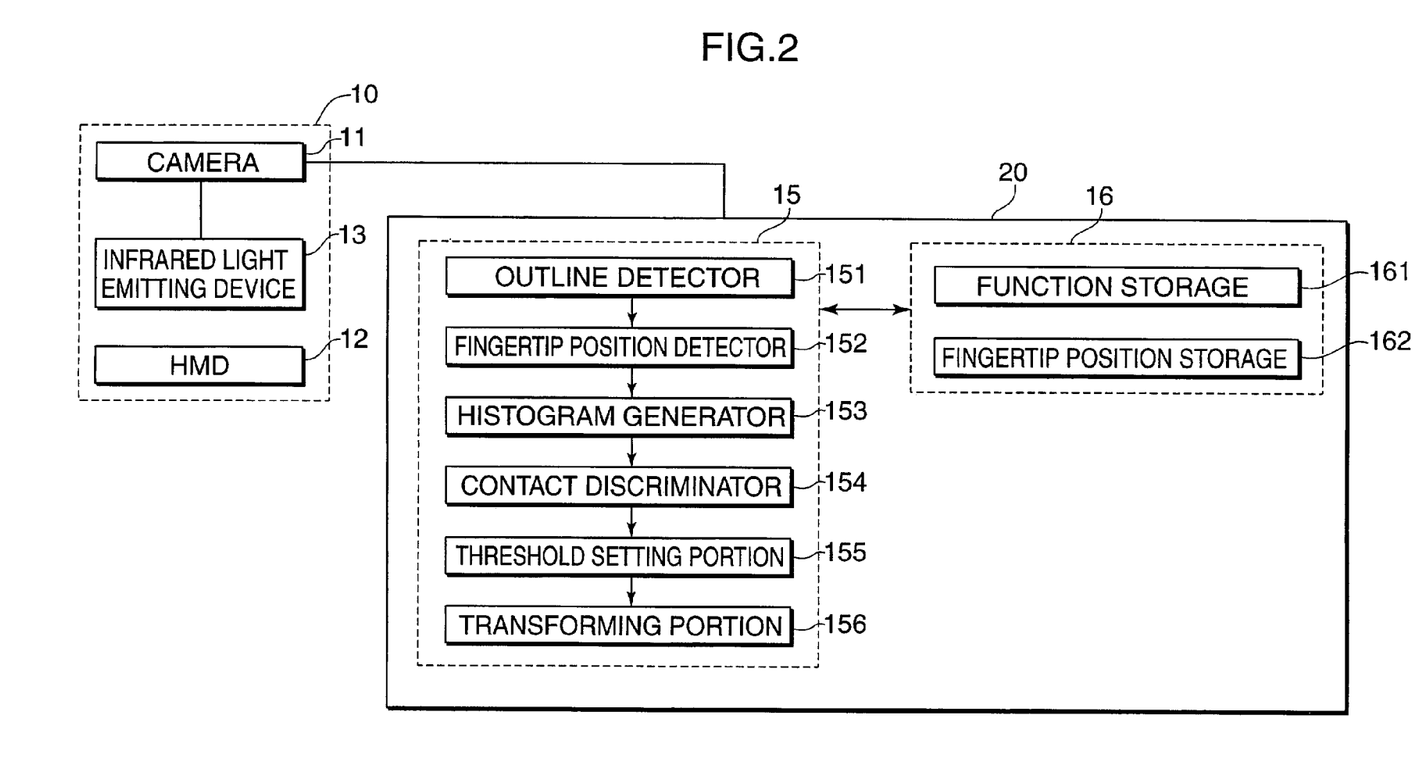
FIG. 2 is a block construction diagram of the information input system.

FIG. 2 is a block construction diagram of the information input system.

The computer main unit 20 is an ordinary computer including a CPU (central processing unit), a ROM (read only memory) and a RAM (random access memory) and is functionally provided with a program executing device 15 and a storage device 16.

The storage device 16 is mainly formed by a RAM and includes a function storage 161 and a fingertip position storage 162. The function storage 161 is adapted to store functions used for a threshold setting portion 155 to set a threshold value. The fingertip position storage 162 is adapted to store coordinates obtained by transforming the coordinates of a fingertip OF detected from the photographed image by a fingertip position detector 152 in accordance with equation (3) to be described later by means of a transforming portion 156.

The program executing device 15 is provided with an outline detector 151, the fingertip position detector 152, a histogram generator 153, a contact discriminator 154, the threshold setting portion 155 and the transforming portion 156.

Figure 3A:
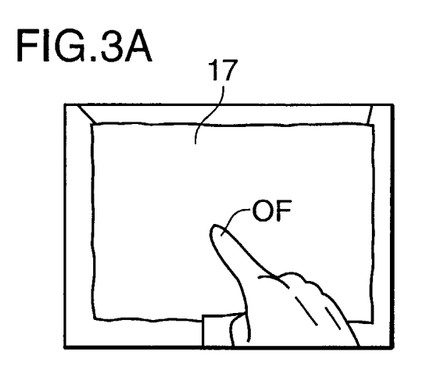
FIG. 3A shows an infrared reflected image photographed by a camera.
Figure 3B:
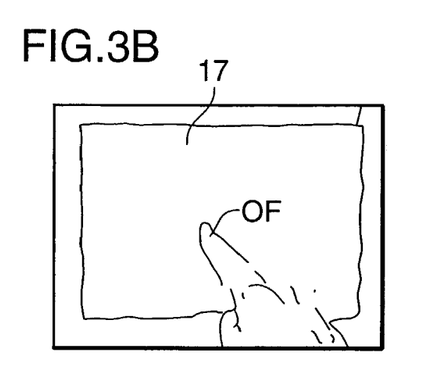
FIG. 3B shows an image obtained by applying a line-thinning processing to the image of FIG. 3B.
Figure 3C:
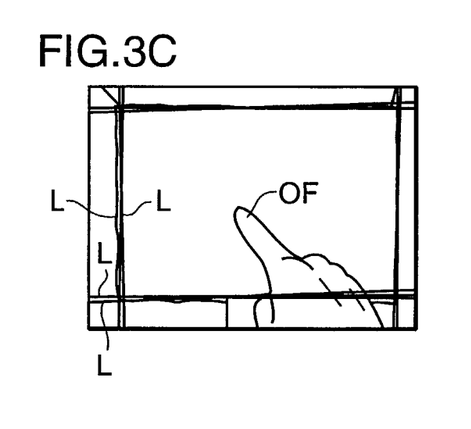
FIG. 3C shows an image obtained by applying a Hough transform to the image of FIG. 3B.
Figure 3D:
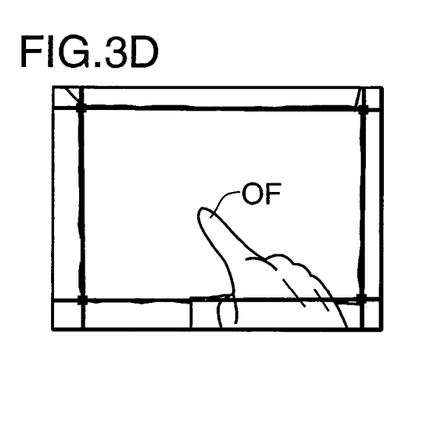
FIG. 3D shows an image in which the contour line of the input surface of FIG. 3C is specified.

The outline detector 151 applies an edge detection, a binary processing and a Hough transform to the image photographed by the camera 11 to detect straight lines representing the outline of the input surface 17. FIGS. 3A, 3B, 3C and 3D are diagrams showing a process of detecting the outline of the input surface 17, wherein FIG. 3A shows the photographed image picked up by the camera 11, FIG. 3B shows an image obtained by applying a line-thinning processing to the image of FIG. 3B, FIG. 3C shows an image obtained by applying the Hough transform to the image of FIG. 3B, and FIG. 3D shows an image in which the contour line of the input surface of FIG. 3C is specified. As shown in FIG. 3C, there is a possibility of detecting a plurality of straight lines L for each side representing the outline of the input surface 17 if the Hough transform is applied to the photographed image to which the line-thinning processing is applied. Accordingly, the outline detector 151 regards the straight lines having similar inclinations and proximately located ends as the same straight line and bundles them into one straight line, thereby determining four sides of the image representing the input surface 17. Intersections of these four sides are obtained as vertices of the input surface 17, and an inner area defined by these vertices is specified as the input surface 17. In such a case, the outline detector 151 is not necessarily required to obtain four vertices since the input surface 17 can be specified if three vertices are obtained.

If the operator makes an inputting operation by one hand while holding the input surface 17 by the other hand, the hand holding the input surface 17 is displayed in the photographed image. However, in such a case, the outline detector 151 removes an image of the hand displayed overlapping the outline of the input surface 17.

Figure 4:
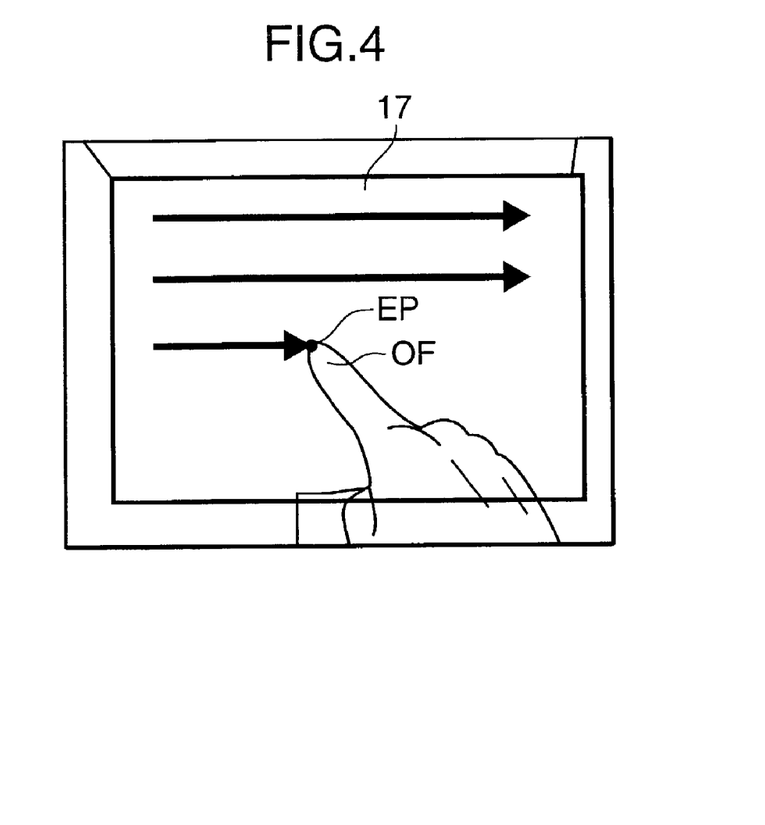
FIG. 4 is a diagram showing how the position of a fingertip is detected.

The fingertip position detector 152 horizontally scans the input surface 17 expressed in the image (see FIG. 3B), to which the edge detection, the binary processing and the line-thinning processing were applied, successively line by line with the upper-left vertex of the input surface 17 as a starting point, and detects an edge position EP detected at first as the position of the fingertip OF (see FIG. 4). The fingertip position detector 152 may detect the position of the fingertip OF by horizontally scanning the input surface 17 successively line by line with any of the upper-right, lower-left and the lower-right vertices as a starting point. Alternatively, the position of the fingertip OF may be detected by vertically scanning the input surface 17 successively line by line with any one of the four vertices as a starting point.

Figure 5:
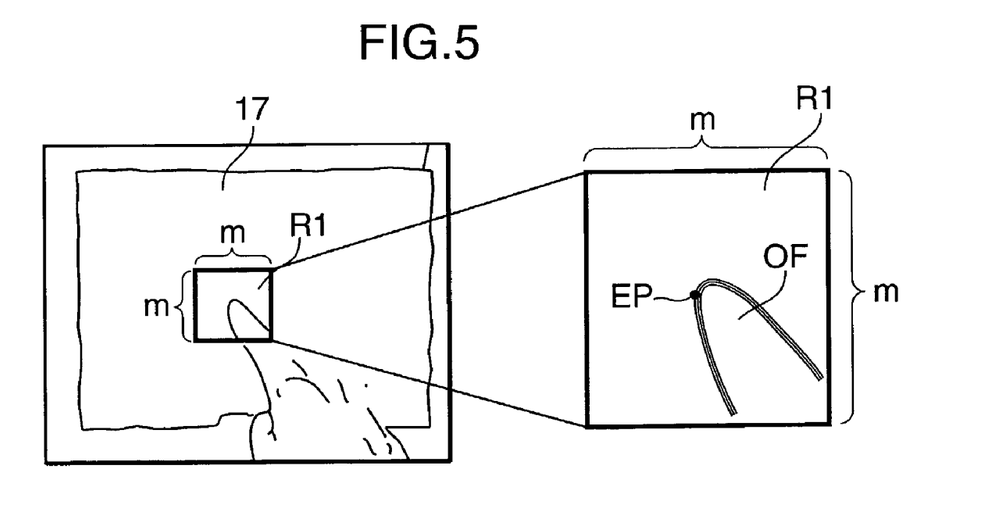
FIG. 5 is a diagram showing a detection area.

The histogram generator 153 sets a m×m pixel area (where m is a value smaller than the shortest side of the input surface 17) centered on the position of the fingertip OF detected by the fingertip position detector 152 as a detection area R1, and differentiates luminance values of the pixels in the set detection area R1 with respect to X, Y-directions to generate a differential histogram.

Specifically, the luminance values of the pixels are differentiated as follows. Assuming that I(x,y) denotes the luminance value of the pixel at coordinates (x,y) of a two-dimensional image, a differential value G(x,y) at the coordinates (x,y) is calculated by following equation (1):

$$(G(x,y))^2 = ((I(x+\Delta x,y)-I(x,y))/\Delta x)^2 + ((I(x,y+\Delta y)-I(x,y))/\Delta y)^2 \quad (1)$$

In image processing, the differential value of the luminance value of the pixel is made stronger against noise included in the luminance value by the use of filtering called sobel operator. If this sobel filter is used, the differential value G(x,y) at the coordinates (x,y) is expressed by following equation (2):

$$(G(x,y))^2 = \{I(x+1,y+1) + 2*I(x+1,y) + I(x+1,y-1) - I(x-1,y+1) - 2*I(x-1,y) - I(x-1,y-1)\}^2 + \{I(x+1,y+1) + 2*I(x,y+1) + I(x-1,y+1) - I(x+1,y-1) - 2*I(x,y-1) - I(x-1,y-1)\}^2 \quad (2)$$

Figure 6A:
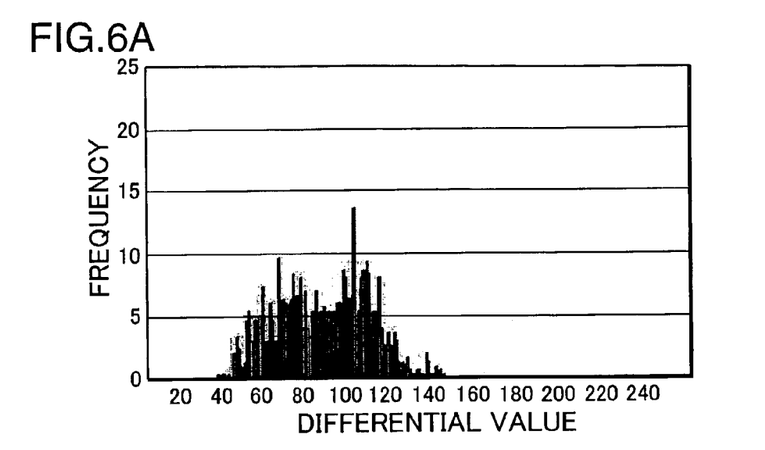
FIG. 6A shows a case where a distance between the input surface and the fingertip is 0 cm.
Figure 6B:
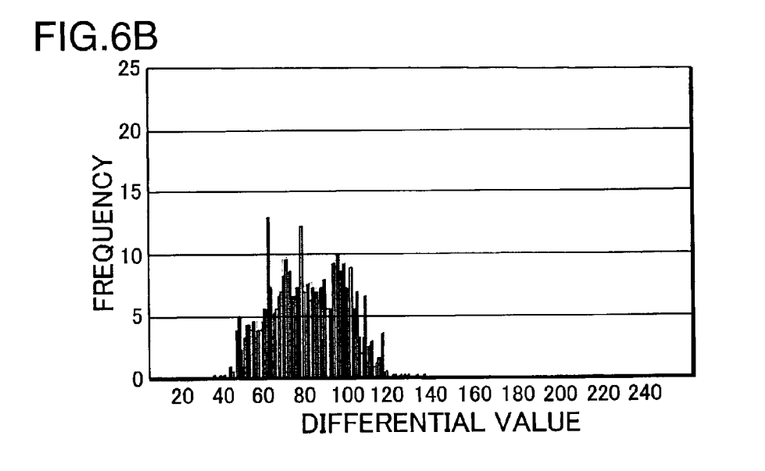
FIG. 6B shows a case where the distance between the input surface and the fingertip is 3 cm.
Figure 6C:
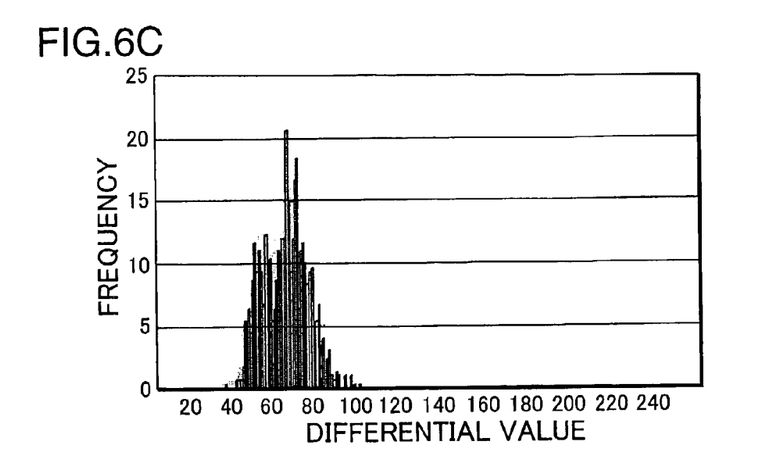
FIG. 6C shows a case where the distance between the input surface and the fingertip is 5 cm.

The contact discriminator 154 calculates a variance value (distribution range) of the histogram generated by the histogram generator 153 and compares it with the threshold value set by the threshold setting portion 155, thereby discriminating whether or not the input surface 17 and the fingertip OF are in contact. Since the luminance of the reflected infrared light varies depending on the distance from the camera to the object, the luminance of the image near the fingertip OF varies depending on the distance between the input surface 17 and the fingertip OF. FIGS. 6A to 6C are graphs showing exemplary differential histograms of the m×m pixel detection area R1 centered on the fingertip OF, wherein vertical and horizontal axes represent frequency and differential value, respectively. FIG. 6A shows a case where the distance between the input surface 17 and the fingertip OF is 0 cm, FIG. 6B shows a case where the distance between the input surface 17 and the fingertip OF is 3 cm, and FIG. 6C shows a case where the distance between the input surface 17 and the fingertip OF is 5 cm. As can be seen from FIGS. 6A to 6C, the differential histogram becomes narrower and the variance value becomes smaller as the distance between the input surface 17 and the fingertip OF increases. On the other hand, the differential histogram becomes wider and the variance value becomes larger as the distance between the input surface 17 and the fingertip OF decreases. Whether or not the input surface 17 and the fingertip OF are in contact can be discriminated based on the variance value.

Specifically, the contact discriminator 154 compares the variance value of the generated differential histogram with the threshold value set by the threshold setting portion 155, and judges that the input surface 17 and the fingertip OF are in contact if the variance value is larger than the set threshold value, while judging that the input surface 17 and the fingertip OF are not in contact if the variance value is smaller than the set threshold value.

Figure 7:
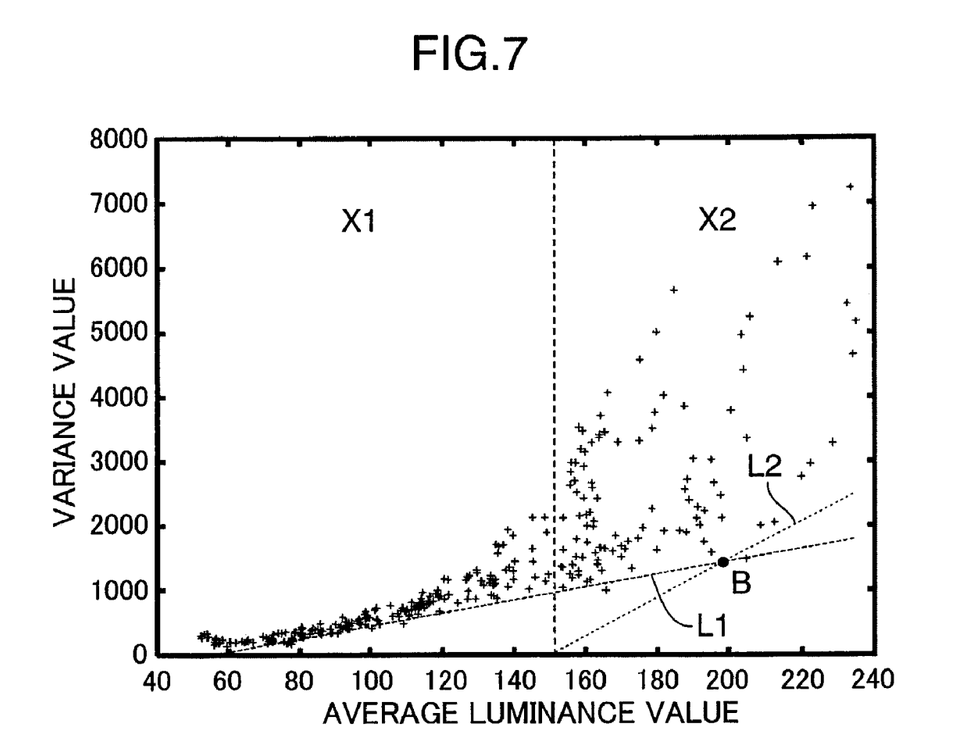
FIG. 7 is a graph showing a relationship between an average luminance in the detection area and a variance value when a distance between a camera and the input surface is changed with the fingertip held in contact with the input surface.

The threshold setting portion 155 dynamically sets a proper threshold value in accordance with the distance between the camera 11 and the input surface 17. Specifically, the threshold setting portion 155 sets the threshold value as follows. FIG. 7 is a graph used to explain how the threshold value is set, i.e. showing a relationship between an average luminance of the detection area R1 and the variance value of the differential histogram when the distance between the camera 11 and the input surface 17 is changed. The vertical and horizontal axes of the graph of FIG. 7 represent the variance value of the differential histogram and the average luminance of the detection area R1. Points in FIG. 7 represent the relationship of the variance value and the luminance value observed while changing the relative positions and orientations of the camera 11 and the input surface 17. It can be understood from FIG. 7 that the variance value moderately increases in an area X1 where the luminance value is smaller (first area), whereas it is suddenly increases in an area X2 where the luminance value is larger (second area). Accordingly, this graph is divided into the first and second areas, and the inclinations of straight lines are calculated by linearly approximating the respective points and the straight lines are calculated by adjusting values at the ends of the straight lines become minimum in the respective areas. The straight lines in the first area and the second area are referred to as functions L1, L2, respectively. By setting the average luminance value at the intersection of the functions L1, L2 as a boundary value B, the threshold value is determined using the function L1 if the average luminance value of the detection area R1 is smaller than the boundary value B while being determined using the function L2 if the average luminance of the detection area R1 is larger than the boundary value B.

Specifically, in the detection area R1, if the average luminance value is smaller than the boundary value B, it is put into the function L1. The contact discriminators 154 judges that the input surface 17 and the fingertip OF are in contact if the calculated variance value is larger than the resulting variance value while judging that they are not in contact unless otherwise. The functions L1, L2 obtained beforehand in the registration mode to be described later are stored in a function storage 161.

The transforming portion 156 calculates coordinates U(u, v) from coordinates P(u,v) of the fingertip OF in accordance with equation (3) for transforming the coordinates of the fingertip OF on the input surface 17 such that coordinates P00, P01, P10, P11 of the four vertices of the input surface 17 are to be located at the vertices of squares each side of which has a length of 1, and stores the calculated coordinates U(u,v) in the fingertip position storage 162.

Further, when the trace of the fingertip OF is displayed on the HMD 12, the transforming portion 156 reads the coordinates U(u,v) stored in the fingertip position storage 162, calculates the coordinate P(u,v) in accordance with equation (3), superimposes them on the photographed image and displays the resulting image.

$$P(u,v) = (1-v)((1-u)P_{00} + uP_{10}) + v((1-u)P_{01} + uP_{11}) \quad (3)$$

where 0<u, v<1.

The shape of the input surface 17 photographed by the camera 11 varies depending on the three-dimensional positional relationship between the camera 11 and the input surface 17. For example, the four vertices of the input surface 17 differ in an image obtained by photographing the input surface 17 from front and the one obtained by oblique photographing the input surface 17. Accordingly, perspective projection needs to be applied assuming the spatial positions of the input surface 17 and the fingertip OF in order to precisely store the coordinates of the fingertip OF. However, since this information input system is designed to input hand-written memos including pictures and characters, it is sufficient to grasp the rough figure of the inputted trace and its positional relationship. Thus, no problem is presented even if the obtained image is slightly deviated from a precisely projected image. Therefore, the transforming portion 156 applies reverse transform to the coordinates P(u,v) of the fingertip OF in the photographed image in accordance with equation (3), thereby calculating the coordinates U(u,v) of the fingertip OF and storing them in the fingertip position storage 162.

Figure 8A:
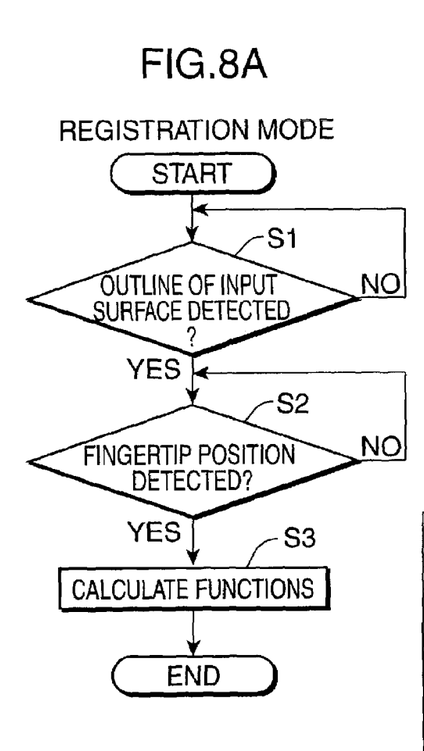
FIGS. 8A and 8B are flow charts showing an operation of the information input system.
Figure 8B:
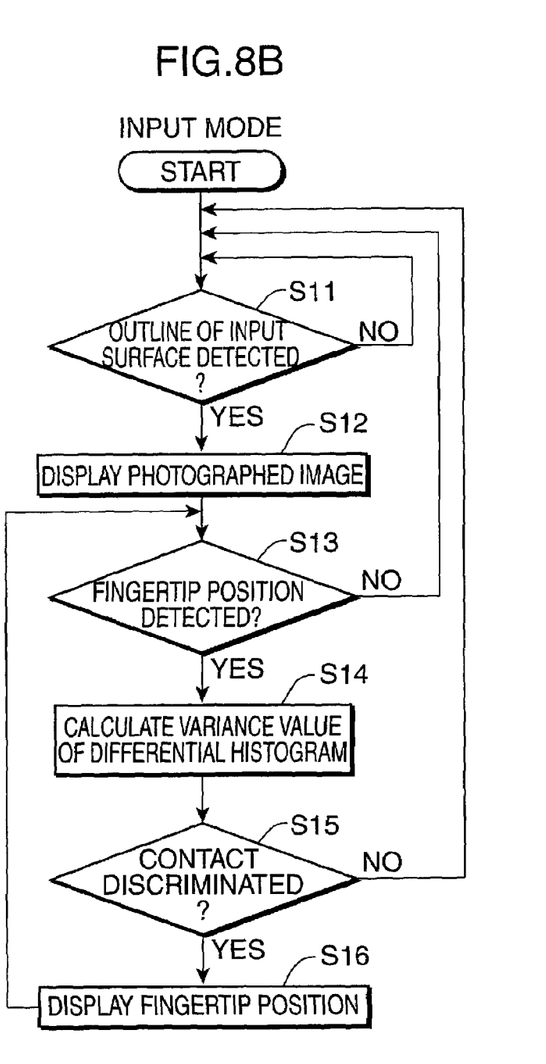

Next, the operation of the information input system is described. The information input system has two modes: the registration mode for calculating the functions for determining the threshold value and an input mode for receiving an inputting operation made by the operator. FIGS. 8A and 8B are flow charts showing the operation of the information input system, wherein FIG. 8A is the flow chart of the registration mode and FIG. 8B is the flow chart of the input mode.

(Registration Mode)

First, in Step S1, the outline detector 151 applies the edge detection, binary processing, line-thinning processing and Hough transform to the photographed image to detect the outline of the input surface 17. During these processings, if a plurality of straight lines are detected as those representing the outline, the outline detector 151 bundles a plurality of contour lines-having approximate inclinations and ends into one contour line. If the outline of the input surface 17 cannot be detected in Step S1 (NO in Step S1), the outline is detected again. On the other hand, Step S2 follows if the outline of the input surface 17 can be detected (YES in Step S1).

In Step S2, the fingertip position detector 152 horizontally scans the image, to which the outline detector 151 applied the edge detection, binary processing, thin-lining processing and Hough transform, successively line by line from the upper-left vertex of the input surface 17, and assumes the position where the edge is first detected as the position of the fingertip OF. Step S3 follows if the position of the fingertip OF can be detected in Step S2 (YES in Step S2). On the other hand, this routine returns to Step S1 if the position of the fingertip OF cannot be detected (NO in Step S2).

In Step S3, the threshold setting portion 155 sets a square area of m×m pixels including the position of the fingertip OF detected by the fingertip position detector 152 as the detection area R1, obtains the functions L1, L2 for determining the threshold value based on the relationship between the average luminance value of the detection area R1 and the variance value of the differential histogram when the operator changes the position of the camera 11 while holding his fingertip OF in contact with the input surface 17, and stores the obtained functions L1, L2 in the function storage 161. Here, since the average luminance value of the detection area R1 corresponds to the distance between the camera 11 and the input surface 17, a suitable threshold value corresponding to the distance between the camera 11 and the input surface 17 can be set if the threshold value is set using these functions L1, L2.

(Input Mode)

First, in Step S11, the outline detector 151 detects the outline of the input surface 17 as in Step S1. In Step S12, the HMD 12 displays an image photographed by the camera 11. If the outline of the input surface 17 cannot be detected in Step S11 (NO in Step S11), the outline is detected again. On the other hand, Step S12 follows if the outline of the input surface 17 can be detected (YES in Step S11).

In Step S12, the HMD 12 displays the image photographed by the camera 11.

In Step S13, the fingertip position detector 152 detects the position of the fingertip OF from the image photographed by the camera 11 as in Step S2. This routine returns to Step S11 if the fingertip position detector 152 cannot detect the position of the fingertip OF in Step S13 (NO in Step S13), whereas Step S14 follows if the fingertip position detector 152 can detect the position of the fingertip OF in Step S13 (YES in Step S13).

In Step S14, the histogram generator 153 generates the differential histogram of the detection area R1 and calculates the variance value of the generated differential histogram.

In Step S15, the contact discriminator 154 specifies the threshold value corresponding to the average luminance value of the detection area R1 using the function stored in the function storage 161 and compares the specified threshold value with the variance value calculated in Step S14, thereby discriminating whether or not the fingertip OF is in contact with the input surface 17. During this processing, the contact discriminator 154 judges that the fingertip OF is in contact with the input surface 17 if the variance value calculated in Step S14 is larger than the set threshold value. On the other hand, the contact discriminator 154 judges that the fingertip OF is not in contact with the input surface 17 if the variance value calculated in Step S14 is smaller than the set threshold value. In this case, the coordinates of the fingertip OF detected in Step S13 are transformed by the transforming portion 156 and stored in the fingertip storage 162.

Step S16 follows if the fingertip OF and the input surface 17 are judged to be in contact in Step S15 (YES in Step S15), whereas this routine returns to Step S11 if the fingertip OF and the input surface 17 are judged not to be in contact in Step S15 (NO in Step S15).

In Step S16, the transforming portion 156 transforms the coordinates U(u,v) of the fingertip OF stored in the fingertip position storage 163 into those in the coordinate systems of the photographed images using equation (3), thereby calculating P(u,v) and displays the image of the fingertip OF on the HMD 12 while superimposing it on the photographed image. Then, this routine returns to Step S13 to detect the position of the fingertip OF again.

The present invention can also be embodied as follows.

(1) In the information input system according to the foregoing embodiment, whether or not the fingertip OF is in contact with the input surface 17 is discriminated by applying the image processings to the image picked up by the camera 11. However, the present invention is not limited thereto. Two cameras (not limited to infrared cameras) installed at positions spaced apart by a specified distance may be caused to photograph the input surface 17, the three-dimensional position of the fingertip OF may be measured by the principle of trigonometric distance metering, and whether the fingertip OF is in contact with the input surface 17 may be discriminated based on the measurement result.

(2) Although the trace of the operator's fingertip OF moved while being held in contact with the input surface 17 is displayed on the HMD 12 in the foregoing embodiment, a trace of the movement of a pencil, a ballpoint pen or a like member held by the operator when such a member is moved in contact with the input surface 17 may be displayed on the HMD 12.

(3) Although the rectangular input surface is used in the foregoing embodiment, the input surface is not limited to such a shape and may take a circular or other shape.

(4) In the foregoing embodiment, the transforming portion 156 transforms the coordinates of the fingertip OF in such a manner as to be located in an area where the four vertices P00 to P11 of the input surface 17 are vertices of a square each side of which has length of 1. However, the present invention is not limited thereto. The coordinates of the fingertip OF may be so transformed as to be located in an area having a rectangular shape, a circular shape or any shape other than the square shape.

Figure 9:
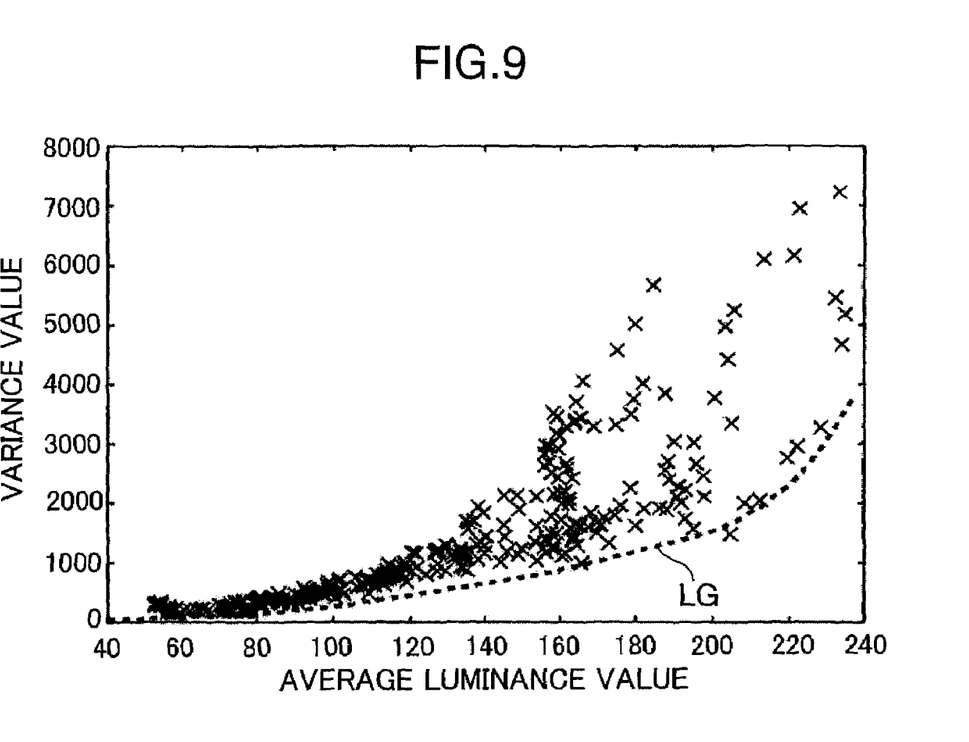
FIG. 9 is a graph showing another function used for a threshold setting device to set a threshold value.

(5) In the foregoing embodiment, the threshold setting portion 155 sets the threshold value using the functions L1, L2 represented by two straight lines calculated by linearly approximating the respective points as shown in FIG. 7. However, the present invention is not limited thereto. A function represented by a curve LG as shown in FIG. 9 may be set as a function used to set the-threshold value.

In summary, the inventive information input system for receiving the information inputted by the operator as the input information is provided with a photographing means for picking up an image of a specified detection area including an operable object and a touchable object touchable by the operable object as a photographed image; a contact discriminating means for specifying the operable object and the touchable object from the photographed image to discriminate whether or not the operable object and the touchable object are in contact with each other; a detecting means for detecting the relative position of the operable object with respect to the touchable object if the contact discriminating means judges that the operable object and the touchable object are in contact with each other; and a receiving means for receiving the trace of the operable object on the touchable object as the input information by repeatedly detecting the relative position of the operable object with respect to the touchable object.

With this construction, whether or not the operable object such as a fingertip or a pen held by the operator is in contact with the touchable object such as a note or a thick sheet is discriminated by the contact discriminating means. If they are in contact, the relative position of the operable object with respect to the touchable object is detected by the detecting means. By repeatedly detecting the relative position of the operable object with respect to the touchable object, the trace of the operable object moved in contact with the touchable object is received as the input information by the receiving means.

Specifically, since the trace of the operable object can be received as the input information only when the operator moves the operable object on the touchable object, the inputting operation can be performed by intuition and operability in inputting hand-written characters and images can be remarkably improved. Further, since the trace of the operable object is received as the input information only when the operable object is in contact with the touchable object, it is not necessary, unlike the conventional system for inputting the characters hand-written in the air, to place the finger outside an image frame of a video camera every time one character is completely written, and the received information needs not be written with a single stroke, thereby realizing a more natural input method.

Preferably, the photographing means includes an infrared image pickup means for picking an infrared image up as the photographed image, the contact discriminating means generates a differential histogram by applying a differential processing to the luminance values of pixels of the infrared image to calculate differential values of the respective pixels and discriminates whether or not the operable object and the touchable object are in contact with each other based on a variance value of the generated differential histogram.

In such a case, since the photographing means picks up the photographed image using infrared rays, the luminance of the photographed image near the fingertip changes according to a distance between the operable object and the touchable object. Thus, if the differential histogram is generated by extracting an image including the fingertip image from the photographed image and calculating the differential values at the respective pixels, the variance value of the generated differential histogram increases as the fingertip approaches the touchable object. Therefore, whether or not the operable object is in contact with the touchable object can be judged based on the variance value of the differential histogram. As a result, whether or not the operable object and the touchable object are in contact can be discriminated by image processing without actually measuring the three-dimensional positional relationship between the operable object and the touchable object, and the system can be simplified.

Preferably, the contact discriminating means discriminates whether or not the operable object and the touchable object are in contact with each other by comparing a threshold value stored beforehand with the variance value of the differential histogram.

In such a case, a value calculated by an experiment or the like is stored as the threshold value beforehand, and whether or not the operable object and the touchable object are in contact is discriminated by comparing the calculated variance value with this threshold value. Thus, a processing time can be shortened.

Preferably, the contact discriminating means obtains a specified function based on an average luminance value of the detection area and the variance value of the differential histogram corresponding to a distance between the photographing means and the touchable object when this distance is changed with the touchable object held in contact with the operable object, and dynamically sets the threshold value in accordance with the obtained specified function.

In such a case, the function defining a relationship between the variance value of the differential histogram and the average luminance value corresponding to this variance value is obtained by plotting the variance values of the differential histograms generated according to distances and the average luminance values corresponding to these variance values and extracts such a point where the average luminance value is at minimum for the photographed image. The average luminance value of the photographed image is put into this function to set the variance value corresponding to the average luminance value as a threshold value. Since this enables a proper threshold value to be dynamically set according to the distance between the photographing means and the touchable object, whether or not the operable object and the touchable object are in contact can be precisely discriminated even if the distance between the photographing means and the touchable means is changed.

Preferably, the detecting means transforms relative coordinates of the operable object with respect to the touchable object using a specified function for transforming the shape of the touchable object into a fixed area and stores the obtained coordinates in the storage.

In such a case, since the relative position of the operable object with respect to the touchable object is transformed based on the specified function for transforming the shape of the touchable object into the fixed specified area, the relative position of the operable object can be precisely stored even if the shape of the touchable object included in the photographed image changes.

Preferably, the information input system is further provided with a display means for displaying the information received by the receiving means, and the photographing means is so constructed as to be integral to the display means.

In such a case, since the photographing means and the display means are integrally constructed, the device is allowed to have a more compact construction. This makes the photographing means and the display means easily mountable on the operator's head or the like, whereby operability in a wearable environment can be remarkably improved.

Preferably, the operable object is the operator's finger and the touchable object is a flat member.

In such a case, since the trace of the finger moving on the member is obtained as the input information, input by intuition can be made possible. Further, there is no need for a special device such as a pen device, thereby enabling the operator to more conformably input.

Preferably, the photographing means includes a first photographing means for picking up the image of the specified detection area including the operable object and the touchable object as a first image and a second photographing means provided at a position different from the first photographing means for picking up the image of the specified detection area including the operable object and the touchable object as a second image, and the contact discriminating means discriminates whether or not the operable object and the touchable object are in contact with each other by the principle of trigonometric distance metering using the first and second photographed images.

In such a case, the spatial positions of the operable object and the touchable object are measured by the principle of trigonometric distance metering, and whether or not the operable object is in contact with the touchable object can be discriminated based on the measured positions. Thus, the discrimination can be precisely made.

This application is based on Japanese patent application serial No. 2002-255676, filed in Japan Patent Office on Aug. 30, 2002, the contents of which are hereby incorporated by reference. In addition, this application is based on an article "Wearable Vision Interfaces: towards Wearable Information Playing in Daily Life" distributed at a seminar held on Feb. 28, 2002 and Mar. 01, 2002 at Nara Institute of Science and Technology, the contents thereof are thus incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An information input system for receiving an information inputted by an operator as an input information, comprising:

photographing means for picking up an image of a specified detection area including an operable object and a touchable object touchable by the operable object as a photographed image, said photographing means including an infrared image pickup means for producing an infrared image as a photographed image of the specified detection area including the operable object and the touchable object, contact discriminating means for identifying the operable object and the touchable object from the photographed image and discriminating whether or not the operable object and the touchable object are in contact with each other, detecting means for detecting a relative position of the operable object with respect to the touchable object if the contact discriminating means judges that the operable object and the touchable object are in contact with each other, and receiving means for receiving a trace of the operable object on the touchable object as the input information by repeatedly detecting the relative position of the operable object with respect to the touchable object, and wherein the contact discriminating means generates a differential histogram by applying a differential processing to the luminance values of pixels of the infrared image to calculate differential values of the respective pixels and discriminates whether or not the operable object and the touchable object are in contact with each other based on a variance value of the generated differential histogram.

2. The information input system according to claim 1, wherein the contact discriminating means discriminates whether or not the operable object and the touchable object are in contact with each other by comparing a threshold value stored beforehand with the variance value of the differential histogram.

3. The information input system according to claim 2, wherein the contact discriminating means obtains a specified function based on an average luminance value of the detection area and the variance value of the differential histogram corresponding to a distance between the photographing means and the touchable object when this distance is changed with the touchable object held in contact with the operable object, and dynamically sets the threshold value in accordance with the obtained specified function.

4. The information input system according to claim 3, wherein the specified function includes at least two linear functions obtained by approximating the variance values of the differential histogram.

5. The information input system according to claim 3, wherein the specified function is a function represented by a curve obtained by approximating the variance values of the differential histogram.

6. The information input system according to claim 3, wherein the operable object is the operator's finger and the touchable object is a flat member.

7. The information input system according to claim 2, wherein the operable object is the operator's finger and the touchable object is a flat member.

8. The information input system according to claim 1, wherein the detecting means transforms relative coordinates of the operable object with respect to the touchable object using a specified function for transforming the shape of the touchable object into a fixed area and stores the obtained coordinates in the storage.

9. The information input system according to claim 8, further comprising a display means for displaying the information received by the receiving means, wherein the photographing means is so constructed as to be integral to the display means.

10. The information input system according to claim 1, further comprising a display means for displaying the information received by the receiving means, wherein the photographing means is so constructed as to be integral to the display means.

11. The information input system according to claim 1, wherein the operable object is the operator's finger and the touchable object is a flat member.

12. An information input system for receiving an information inputted by an operator as an input information, comprising:

photographing means for picking up an image of a specified detection area including an operable object and a touchable object touchable by the operable object as a photographed image, the photographing means including a first photographing means for picking up the image of the specified detection area including the operable object and the touchable object as a first image and a second photographing means, provided at a position different from the first photographing means, for picking up the image of the specified detection area including the operable object and the touchable object as a second image.

contact discriminating means for identifying the operable object and the touchable object from the photographed image and discriminating whether or not the operable object and the touchable object are in contact with each other based on trigonometric distance metering using the first and second photographed images, detecting means for detecting a relative position of the operable object with respect to the touchable object if the contact discriminating means judges that the operable object and the touchable object are in contact with each other, and receiving means for receiving a trace of the operable object on the touchable object as the input information by repeatedly detecting the relative position of the operable object with respect to the touchable object.

13. The information input system according to claim 12, wherein the detecting means transforms relative coordinates of the operable object with respect to the touchable object using a specified function for transforming the shape of the touchable object into a fixed area and stores the obtained coordinates in the storage.

14. The information input system according to claim 13, further comprising a display means for displaying the information received by the receiving means, wherein the photographing means is so constructed as to be integral to the display means.

15. The information input system according to claim 14, wherein the operable object is the operator's finger and the touchable object is a flat member.

16. The information input system according to claim 13, wherein the photographing means is an infrared imaging device.

17. The information input system according to claim 12, further comprising a display means for displaying the information received by the receiving means, wherein the photographing means is so constructed as to be integral to the display means.

18. The information input system according to claim 17, wherein the photographing means is an infrared imaging device.

19. The information input system according to claim 12, wherein the photographing means is an infrared imaging device.

* * * * *